March 5, 1935. C. A. HENSON ET AL 1,993,327
TREE TRANSPLANTER AND CONVEYANCE THEREFOR
Filed May 14, 1934 4 Sheets-Sheet 1

Inventors
C. A. Henson
S. C. Gillum
By Clarence A. O'Brien
Attorney

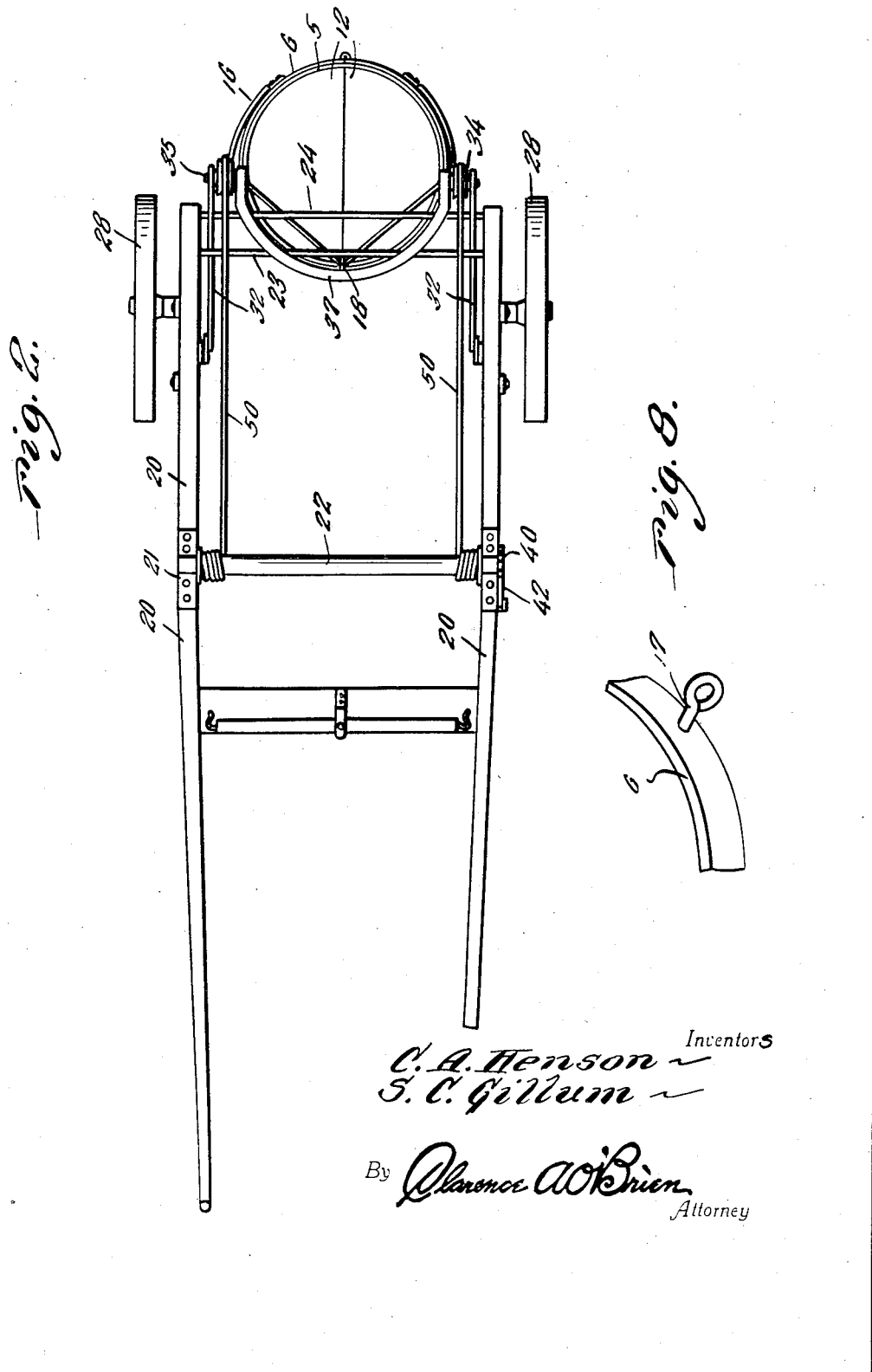

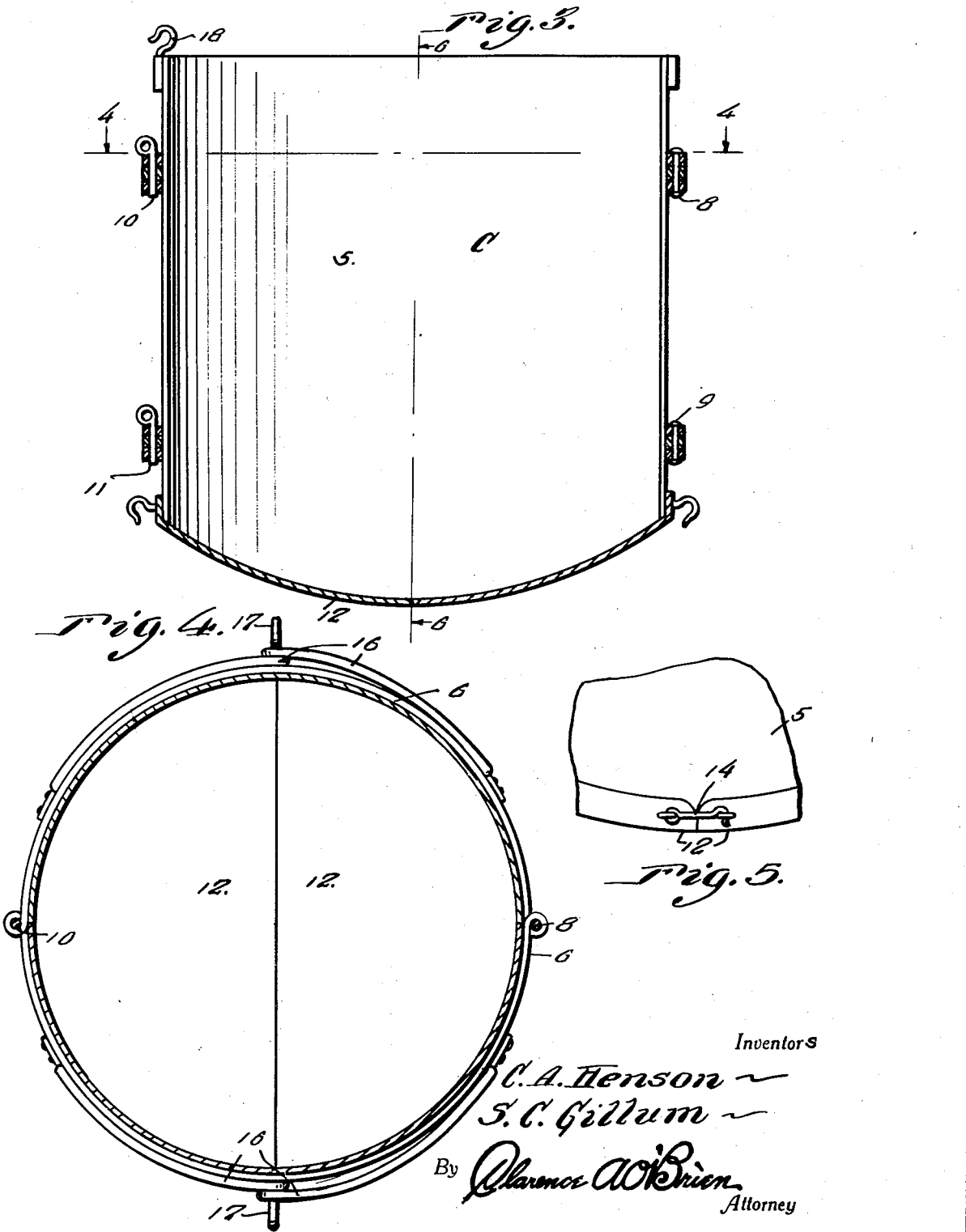

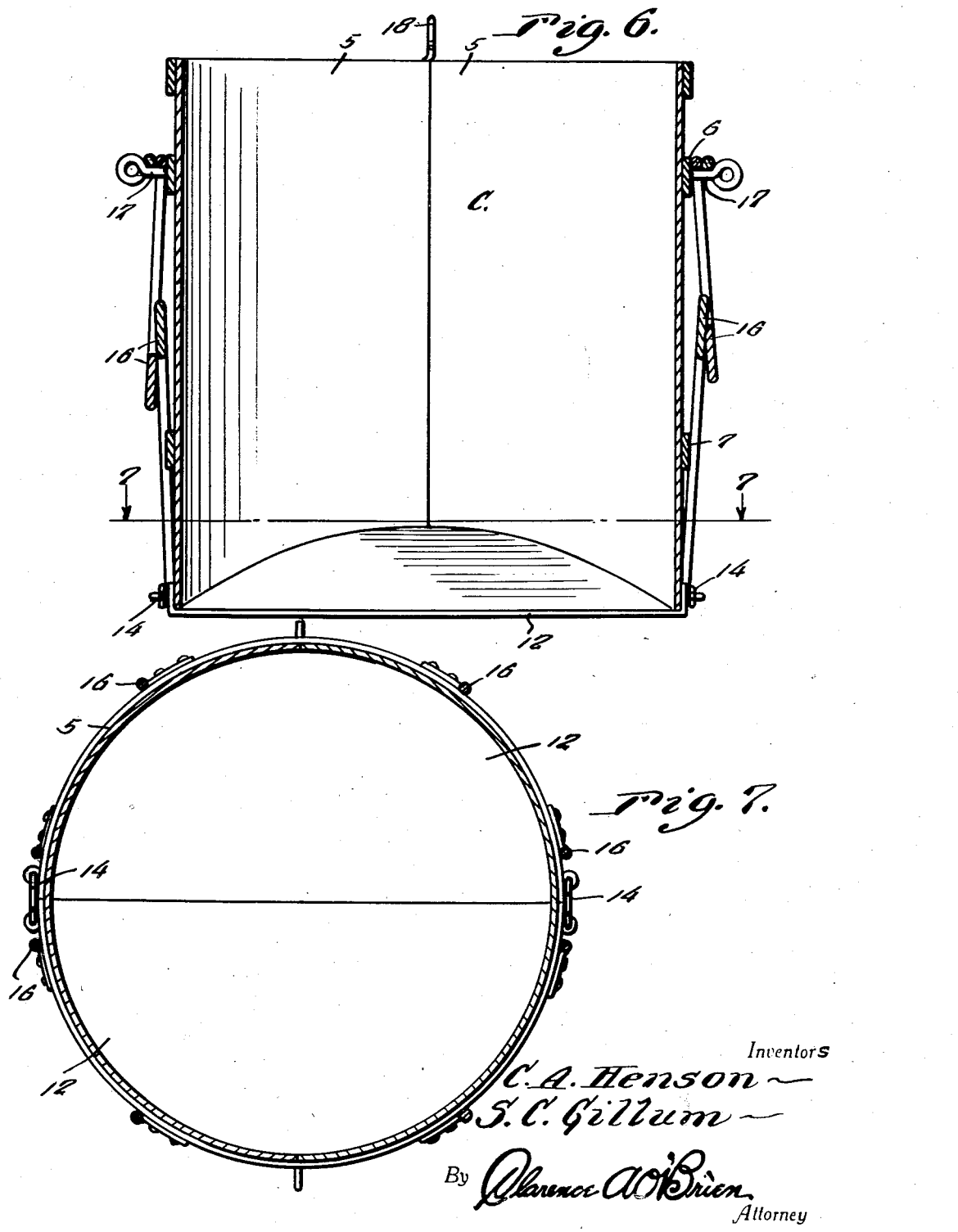

UNITED STATES PATENT OFFICE 1,993,327

TREE TRANSPLANTER AND CONVEYANCE THEREFOR

Claude A. Henson and Samuel C. Gillum, Curtis, Nebr.

Application May 14, 1934, Serial No. 725,662

1 Claim. (Cl. 294—67)

The present invention relates to a tree transplanter and conveyance therefor and has for its prime object to provide means which may be encased about a tree in such a manner so that it may be removed from the ground and replaced in the ground in an easy and convenient manner and also in the conveyance including means for raising and lowering the encasing means.

Another very important object of the invention resides in the provision of a combination transplanter and conveyance therefor which is thoroughly efficient and reliable in use and operation, easy to manipulate, comparatively inexpensive to manufacture and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 2 is a top plan view thereof.

Figure 3 is a vertical section through the transplanter.

Figure 4 is a horizontal section therethrough taken substantially on the line 4—4 of Figure 2.

Figure 5 is a detail elevation showing one of the catches.

Figure 6 is a vertical section taken substantially on the line 6—6 of Figure 3.

Figure 7 is a horizontal section taken substantially on the line 7—7 of Figure 6, and Figure 8 is a perspective view showing a portion of the upper band with the eye bolt projecting therefrom.

Figure 1:
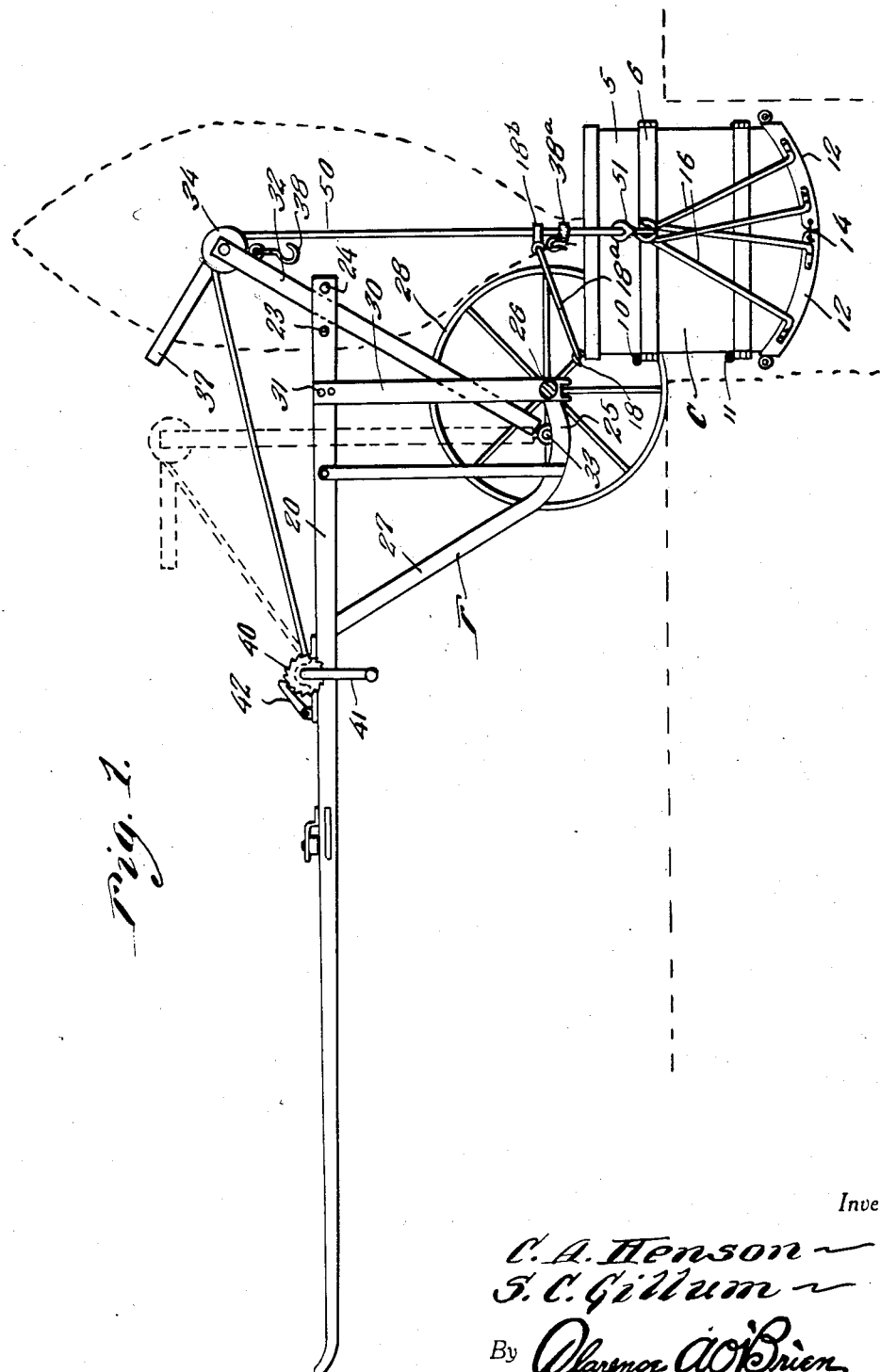
Figure 1 is a side elevation of an apparatus embodying the features of my invention showing the axle in section with one wheel removed.

Referring to the drawings in detail it will be seen that the transplanter comprises a cylinder C including two sections 5—5. Bands 6 and 7 are connected with the cylinders and also formed in sections. The sections of the bands are hingedly connected together as at 8 and 9 respectively and the other ends thereof are detachably connected together by means of pins 10 and 11 respectively. Two flanged bottom sections 12—12 are normally held together by hook fastening elements 14, 14. Each section 12 has a V-shaped rod 16 on each side thereof with the ends fixed thereto and the bight portion engageable over eye bolt 17 projecting outwardly from the band 6. A hook 18 is mounted on the cylinder C at the top thereof and disposed forwardly that is above the pins 10, and is used to engage what may be termed a tilting rope 18$^a$ engaged with eyes on rings 18$^b$ secured to the cables 50. By drawing the rope 18$^a$ thru one of the eyes a tilting of the bucket may be accomplished when the bucket is lifted. A hook 12' is connected to the outer part of the bottom section so that a rope or cable can be attached thereto for pulling the section out of position when the tree is being transplanted.

The conveyance comprises a pair of shafts 20—20 intermediate the ends of which are bearings 21 in which the ends of a drum 22 are journalled. At the rear ends of the shaft 20 there are a pair of rods 23 and 24 the former of which is removable. Frame members F are of a somewhat L-shaped formation having relatively short arms 25 secured to axle 26 and projecting forwardly and then curved and merging into relatively long arms 27 secured to the shaft 20 immediately to the rear of the drum 22. Wheels 28 are rotatable on the ends of the axle 26. Frame bars 30 rise from the axle 26 and are secured to the shaft 20 as at 31. Bars 32 are pivotally mounted as at 33 on the arms 25 of the frame element F and on the upper or free ends of these bars 32 are pulleys 34. The shafts 35 of the pulleys are connected by a curved brace member 37. A ratchet wheel 40 is on the drum 22 at one end and at said end is a crank 41. A pawl 42 cooperates with the ratchet 43.

To take up a tree the operator takes the bottom sections 12 off and places the cylinder around the tree and secures it by means of the pins 10. Then he digs straight down all around the outside of the cylinder and thus lowers it to the desired depth. The bottoms can then be put on one at a time by digging back under the sides and pushing the bottom under as the operator digs in. The cylinder is let down, being careful to cut all roots so that they will not bind on the bottom or sides. When both bottoms are in their place, they can be secured by the fasteners 14. Cables 50 are windable on the drum 22 and trained over the pulleys 34 and hooked as at 51 with the eye pins or bolts 17. By turning the crank 41, of course, the tree transplanter may be raised above the level of the axle 26. The hooks 38$^a$ may be then engaged with the hooks 38 and then the rod 23 may be removed and by further winding the cables on the drum the bars 32 are swung from the full line position shown in Figure 1 to the dotted line position in said figure, and then the transplanter may be lowered to rest on the frame structure. It is thought that the planting operation, which, of course, is practically the reverse of the operation just described will be clearly understood without a detailed description.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In combination, a cylinder including a pair of hingedly connected sections, detachable means for holding the sections in closed position, a pair of bottom sections for the cylinder, means swingably connecting the sections with the cylinder, and detachable means for holding the bottom sections in closed positions.

CLAUDE A. HENSON.
SAMUEL C. GILLUM.